(12) United States Patent
Mukherjee

(10) Patent No.: US 7,162,477 B1
(45) Date of Patent: Jan. 9, 2007

(54) SYSTEM AND METHOD FOR WEB OR FILE SYSTEM ASSET MANAGEMENT

(75) Inventor: Rajat Mukherjee, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 783 days.

(21) Appl. No.: 09/390,154

(22) Filed: Sep. 3, 1999

(51) Int. Cl.
*G06F 7/00* (2006.01)
*G06F 15/16* (2006.01)

(52) U.S. Cl. .................. 707/100; 707/10; 707/102; 709/203; 709/217; 709/219; 715/531

(58) Field of Classification Search ............. 707/1–10, 707/100–102; 709/203, 217–219, 230; 714/4; 715/513
See application file for complete search history.

(56) References Cited

U.S. PATENT DOCUMENTS

| | | | |
|---|---|---|---|
| 5,678,041 A | 10/1997 | Baker et al. ................ 395/609 |
| 5,696,898 A | 12/1997 | Baker et al. ........... 395/187.01 |
| 5,708,780 A | 1/1998 | Levergood et al. .... 395/200.12 |
| 5,745,755 A | 4/1998 | Covey ....................... 395/619 |
| 5,787,254 A | 7/1998 | Maddalozzo, Jr. et al. .................... 395/200.58 |
| 5,889,470 A | 3/1999 | Kaycee et al. ......... 340/825.07 |
| 5,903,732 A | 5/1999 | Reed et al. ............ 395/200.59 |
| 5,918,229 A * | 6/1999 | Davis et al. .................. 707/10 |
| 5,941,944 A * | 8/1999 | Messerly ....................... 707/3 |
| 5,974,455 A * | 10/1999 | Monier ....................... 709/223 |
| 6,035,330 A * | 3/2000 | Astiz et al. ................. 709/218 |
| 6,144,962 A * | 11/2000 | Weinberg et al. ............. 707/10 |
| 6,269,370 B1 * | 7/2001 | Kirsch ......................... 707/10 |
| 6,286,006 B1 * | 9/2001 | Bharat et al. ................. 707/10 |
| 6,782,430 B1 * | 8/2004 | Cragun ....................... 709/245 |
| 2002/0156800 A1 * | 10/2002 | Ong ........................... 707/203 |
| 2004/0215664 A1 * | 10/2004 | Hennings et al. ........ 707/104.1 |

FOREIGN PATENT DOCUMENTS

WO   WO 98/48546   10/1998

OTHER PUBLICATIONS

Rick Hower, "Beyond Broken Links", Internet Systems, Jul. 1997, (pp. 1-5).*
Ingham et al. "Fixing the "Broken-Link" Problem: The W3Objects Approach" Computer Networks and ISDN systems, vol. 28, No. 11, (pp. 1-14), 1255-1268, May 1996.*

* cited by examiner

*Primary Examiner*—John E. Breene
*Assistant Examiner*—Anh Ly
(74) *Attorney, Agent, or Firm*—John L. Rogitz

(57) ABSTRACT

A system and method for managing assets in a file system or plural Web servers includes crawling the assets to identify the assets in the system and any reference pointers, such as hyperlinks in the Web context, to other assets in the system. Metadata representing the assets and pointers is stored in a database that is linked to the assets, such that, e.g., backing up of the database causes the assets to be backed up. Any broken pointers such as hyperlinks that point to non-existent Web pages are addressed. Then, the database and the links between the database and the underlying assets are used to manage subsequent modifications, additions, and deletions to, e.g., assets on a Web server, such that it can be ensured that when a user clicks on a hyperlink, a "file not found" message is avoided.

19 Claims, 4 Drawing Sheets

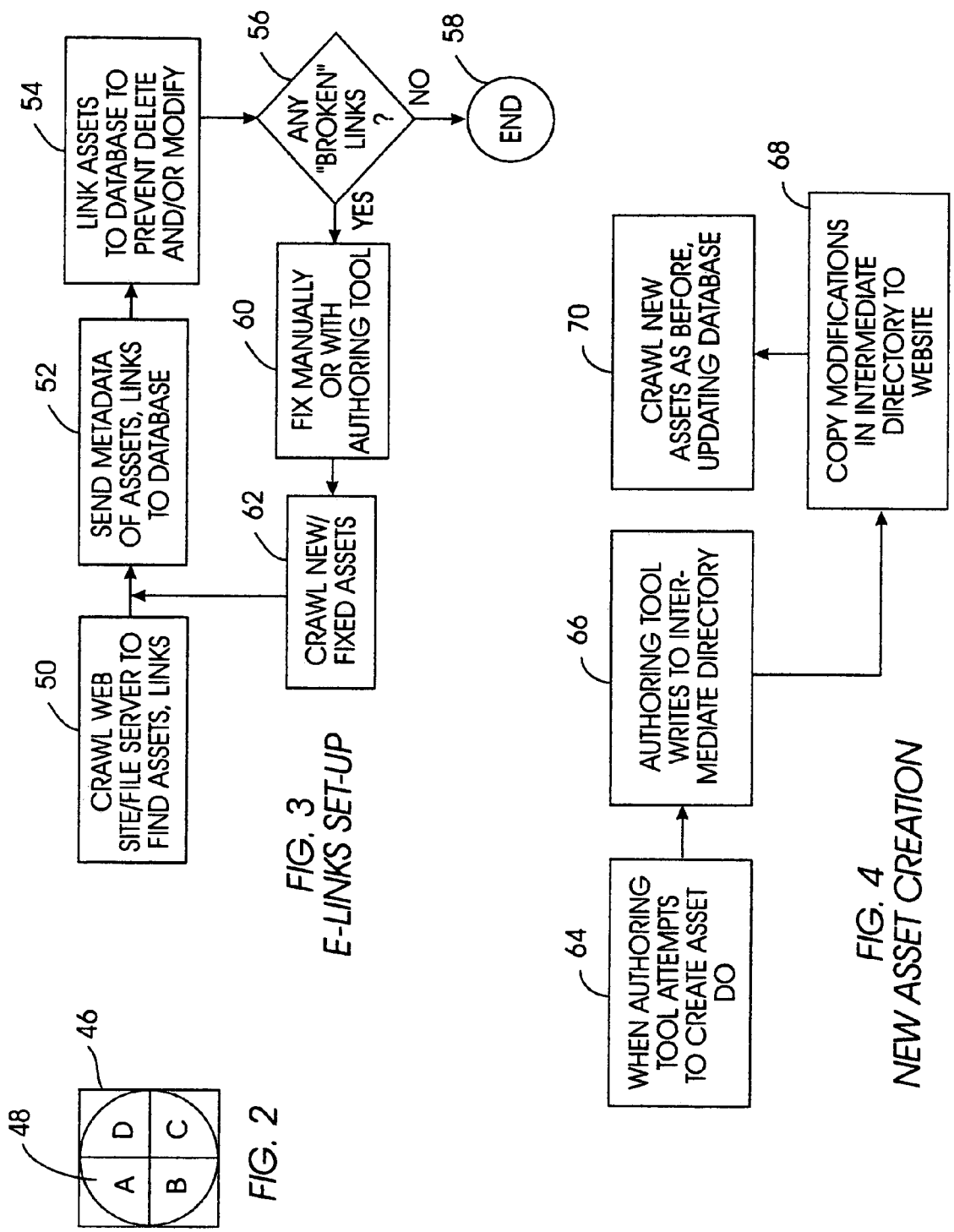

UPDATE OF ASSET

```
<ASSETS>
<GROUP_ASSET>
<GROUPID>2</GROUPID>
<FILE_ASSET>
    <GROUPNUM>2</GROUPNUM>
    <PGROUPNUM>1</PGROUPNUM>
    <URL>HTTP://ELINKS.ALMADEN.IBM.COM/elinks/doc/header_black.html</URL>
    <UID>1</UID>
    <AUTHOR>elinks</AUTHOR>
    <OWNER>dlocal</OWNER>
    <FILESIZE>823</FILESIZE>
</FILE_ASSET>
<FILE_ASSET>
    <GROUPNUM>2</GROUPNUM>
    <PGROUPNUM>1</PGROUPNUM>
    <URL>HTTP://ELINKS.ALMADEN.IBM.COM/elinks/doc/body_index.html</URL>
    <UID>3</UID>
    <AUTHOR>elinks</AUTHOR>
    <OWNER>dlocal</OWNER>
    <FILESIZE>4492</FILESIZE>
</FILE_ASSET>
</GROUP_ASSET>
</ASSETS>
```

FIG. 6

SYSTEM AND METHOD FOR WEB OR FILE SYSTEM ASSET MANAGEMENT

BACKGROUND OF THE INVENTION

1. Field of the Invention

The present invention relates generally to managing assets in a file system or other data storage, and more particularly to managing assets on Web servers.

2. Description of the Related Art

The World Wide Web and other information repositories such as online databases and file servers afford quick access to a large amount of information. Typically, assets on the Web, e.g., Web pages, display not only information but also include reference pointers, referred to as hyperlinks, to other assets (e.g., Web pages, images, audio files, etc.) on the Web. A user browser can be operated to select a hyperlink and thereby cause the pointed-to asset to be displayed on a user's computer. It is to be appreciated that while the discussion below focusses on the Web, the present invention is also directed to file servers in which the assets can be files that might include reference pointers to other files in the system.

To create a Web page with attendant hyperlinks, a software program known as an authoring tool can be used. Authoring tools, however, do not guarantee that pointed-to assets are actually published (i.e., written to the Web server). Also, as understood by the present invention authoring tools typically maintain internal/local repositories of information and can perform local checks on the validity of links, but they do not directly manage the final published assets on the Web server and, hence, cannot guarantee link validity after publication. Moreover, since asset management is typically not coordinated, new versions of pointed-to assets can be published and new versions of pointing assets can be published with old, out-of-date hyperlinks. Furthermore, the lack of asset management on the Web server can result in an asset being moved, inadvertently or maliciously, from where the hyperlink indicates the asset is. Often, pointers to assets become valid only after the pointed-to assets are placed by hand on the server via a manual or automated process (e.g., a program). Consequently, it is frequently the case that a user selecting a hyperlink will be presented with a "file not found" message. This is time consuming and frustrating.

The present invention has carefully considered the above problems and has provided the solution set forth herein to provide guarantees that links are not broken (no "file not found" messages). It also provides, among other things, access control, version control, selective management based on metadata (by author, linkage, date, group information, etc.), individual and bulk asset management with integrity of reference pointers, and coordinated backup and recovery of metadata and assets.

SUMMARY OF THE INVENTION

A computer-implemented method is disclosed for managing assets on plural Web servers. The method includes crawling the Web servers to identify assets and hyperlinks therein. The method also includes storing data representative of the assets and hyperlinks in a database that is used to ensure that when a user browser selects a hyperlink represented in the database, the user is not presented with a "file not found" message.

In a preferred embodiment, the method includes determining that a hyperlink is a broken hyperlink when the hyperlink points to an asset not represented in the database, and then undertaking action to address broken hyperlinks. This can include modifying an asset on the Web server or adding an asset to the Web server such that when a user browser selects a hyperlink represented in the database, the user is not presented with a "file not found" message.

As set forth in greater detail below, the preferred method also includes linking the data in the database to the corresponding assets on the Web servers. Preferably, the linking is undertaken using robust pointers. With this linking, when it is determined that a user is attempting to create a new asset on one of the Web servers, the user can be redirected to an intermediate directory. The new asset is received in the intermediate directory and then copied to the final location, e.g., a Web server's document directory. Next, the new asset is crawled to identify assets and hyperlinks therein, and data representative of the assets and hyperlinks is stored in the database.

Moreover, when it is determined that a user is attempting to modify an existing asset in one of the Web servers, the preferred logic includes unlinking the asset from the database and allowing the user to update the asset to render a modified asset. This aspect of the present logic also includes crawling the modified asset to identify assets and hyperlinks therein, storing data representative of the assets and hyperlinks of the modified asset in the database, and relinking both the modified asset and the original asset to the database.

As intended in the preferred embodiment, the database is remote from the Web servers. Furthermore, owing to the robust pointers used in the preferred embodiment, when the database is backed up the assets and hyperlinks listed in the database are also automatically backed up. Likewise, when the database is recovered, the backed up assets and hyperlinks are automatically recovered and sent to their respective Web servers.

In another aspect, a computer system is disclosed for managing assets in a data repository such as at least one Web server or at least one file system. The computer system includes computer readable code means for identifying the assets and for identifying reference pointers in the assets to other assets in the data repository. Also, the computer system includes computer readable code means for determining whether any broken reference pointers refer to assets not present in the data repository, such that a system manager can address the broken reference pointers. Once fixed, the present invention guarantees that the links will not be subsequently rebroken.

In still another aspect, a computer program product includes at least one program of instructions readable by a Web server to undertake method acts that include crawling the Web server to identify assets and hyperlinks therein. The logic also includes sending metadata representative of the assets and hyperlinks to a database, such that when a user browser selects a hyperlink represented in the database, the user is not presented with a "file not found" message.

In yet another aspect, a computer program product includes a program of instructions that generates data representative of assets and hyperlinks from plural Web servers. In accordance with the present invention, a link manager maintains the database such that when a user browser selects a hyperlink represented in the database, the user is not presented with a "file not found" message.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of a computer program product;

FIG. 3 is a flow chart of the logic for linking database assets to a link table;

FIG. 4 is a flow chart showing the logic for creating new assets while ensuring link integrity;

FIG. 6 is a schematic diagram of metadata associated with remotely-stored assets in accordance with present principles.

DETAILED DESCRIPTION OF THE PREFERRED EMBODIMENTS

Figure 1:
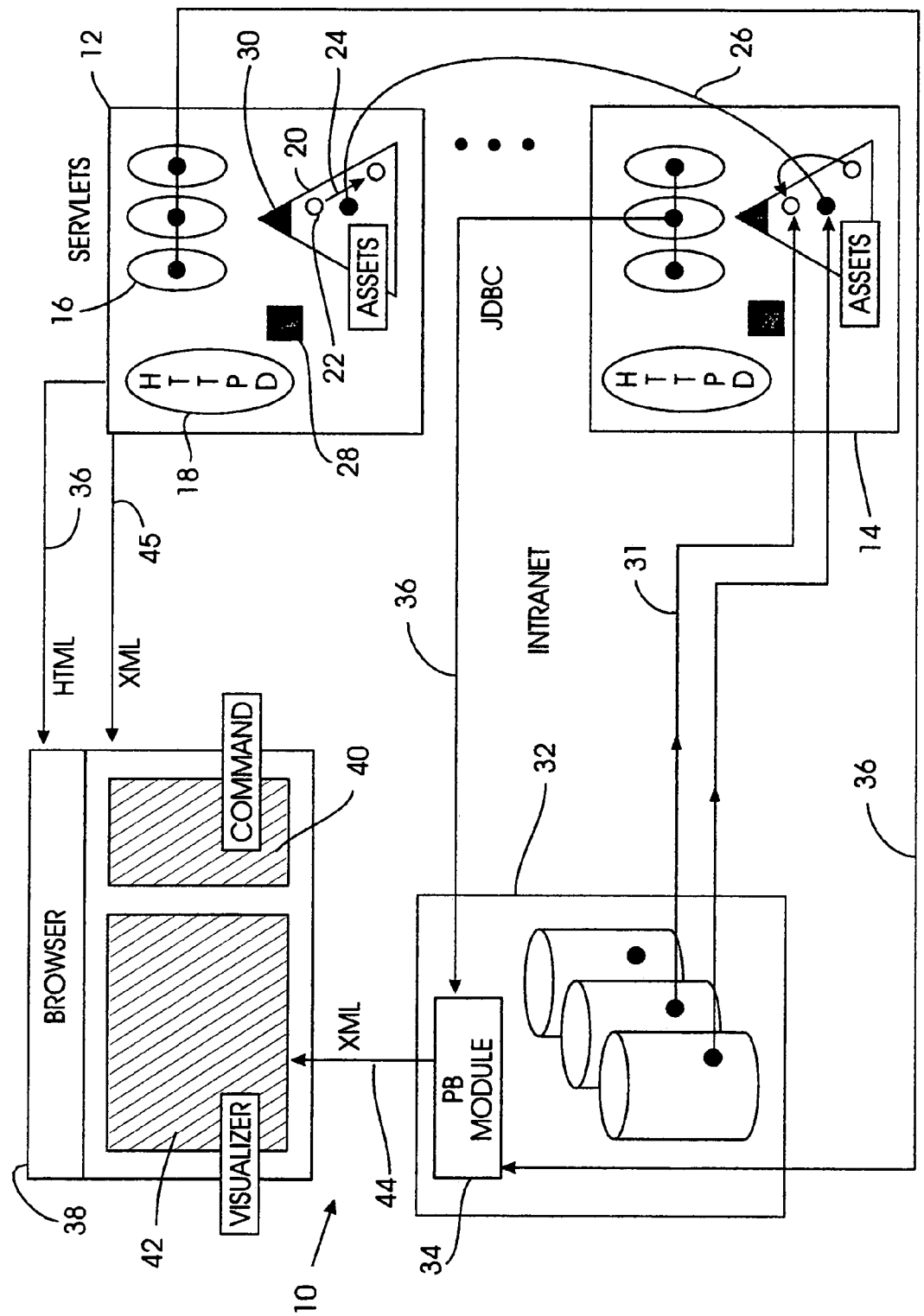
FIG. 1 is a block diagram of the architecture of the present system.

Referring initially to FIG. 1, a system is shown, generally designated 10, for managing assets in a file system or across plural Web servers (only first and second Web servers 12, 14 shown in FIG. 1) in a subset of the Internet, such as in an Intranet. Thus, while the discussion below focusses on the Web server application, it is to be understood that the principles of the present invention apply equally to managing distributed file system assets.

In the embodiment shown, each Web server 12, 14 includes plural software-implemented server control modules 16 that undertake the server-side logic shown in the flow charts below. As indicated in FIG. 1, the server control modules 16 preferably are Java servlets. Also, each Web server 12, 14 includes a respective conventional hypertext transfer protocol module (HTTPD) 18 (i.e., web server software) for communicating via the Internet using hypertext markup language (HTML), or text, or extensible markup language (XML) in accordance with Web principles known in the art.

FIG. 1 shows that each Web server 12, 14 also includes a respective data repository system 20 that stores assets 22, such as Web pages. The assets 22 can include reference pointers 24, such as hyperlinks, to other assets on the same server 12, 14 or, as indicated by the hyperlink 26, to assets on other Web servers in the system 10.

In the presently preferred embodiment, the data repository system 20 of each Web server 12, 14 in the system 10 includes the data management system known as "DataLinks" and disclosed in co-pending U.S. patent application Ser. No. 08/449,600, owned by the same assignee as is the present invention and incorporated herein by reference. Accordingly, each server 12, 14 includes a respective software-implemented data links file manager (DLFM) 28 and a respective data links filesystem filter (DLFF) 30 that function as set forth in the above-referenced patent application and as summarized herein for convenience. Alternatively, the present invention can be used with less preferred systems such as conventional relational database systems, e.g., Oracle database systems.

As incorporated into the present invention, the DataLinks system uses an SQL-based data type to allow robust pointers 31 (e.g., uniform resource listings (URLs)) to the assets 22 to be inserted into a metadata database 32 that includes a software-implemented link manager 34 which undertakes the database-side logic disclosed in greater below. The database 32 can be part of the Web servers 12, 14 or it can be implemented on a computer that is remote from the servers 12, 14. In any case, the pointers 31 establish links between the database 32 and the corresponding assets 22.

In the preferred embodiment, the database 32 includes metadata for each asset 22 and reference pointer 24, 26, as well as other application-specific metadata. As can be appreciated in reference to FIG. 1, the DLFM 28 and DLFF 30 of each server 12, 14 cooperate with link manager 34 to enforce integrity of the assets that are linked to the database 32 via the robust pointer 31. The control modules 16 communicate with the database 32 over the network shown using JDBC communication principles.

As intended by the present invention, the DLFM 28, DLFF 30, and control modules 16 of a server 12, 14, along with the link manager 34, cooperate to ensure that a pointer 31 can be inserted into the database 32 only if the asset 22 being pointed to by the pointer 31 actually exists on the appropriate server 12, 14. Also, once an asset 22 has been linked to the database 32, the asset 22 cannot be deleted or renamed without authorization from the file manager 28. However, the normal access paths to assets 22 are minimally affected; consequently, normal operations such as read and write are minimally affected, and the web server 18 or the control modules 16 can access these assets 22 directly, without database overhead.

Moreover, when the database 32 is backed up, the assets 22 that have been linked to the database 32 are also automatically archived, providing for coordinated recovery and guaranteeing synchronization. Still further, should it become necessary to recover the database 32 from a backed up version of the database, the assets 22 and assets that are linked thereto are automatically checked and, if necessary, recovered from archive and sent to the servers from which they were backed up. It may now be appreciated that while the assets 22 are physically not part of the database 32, they are logically part of the database 32. As a consequence, the present system 10 is highly scalable, and it avoids problems with version control and replication inherent in systems that require redundant physical copies of assets. As mentioned above, direct asset access does not incur database access overhead.

Having thus summarized the preferred DataLinks implementation of the present architecture, the description of FIG. 1 will now be completed. The Web servers 12, 14 can communicate with one or more software-implemented Web browsers 38 that a person can use to input commands using forms or visual interfaces within the browsers 38. Or, an input device 40 can be used. To visualize data such as Web pages on an output device, a monitor 42 can be used. Communication can be via Internet paths 36 using hypertext markup language (HTML) and/or via paths 45 using extensible markup language (XML). For clarity, only the path 36 between the first Web server 12 and the browser 38 is shown, it being understood that the second Web server 14 can also be linked to the browser 38. In addition, a data link 44 can be established between the link manager 34 and the browser 38, to permit a user of the browser 38 to visualize aspects of the database 32. As indicated in FIG. 1, communication over the data link 44 can use extensible markup language (XML). This can happen directly, or via a control on the server that can communicate with the database via the network using, e.g., JDBC.

As intended herein, each of the computers discussed above can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used. Likewise, other input devices, including keypads, trackballs, and voice recognition devices can be used, as can other output devices, such as printers, other computers or data storage devices, and computer networks.

In any case, the processor of each computer accesses the appropriate control modules 16, 34 to undertake the logic of the present invention, which may be executed by a processor as a series of computer-executable instructions. The instructions may be contained on a data storage device with a computer readable medium, such as a computer diskette 46 shown in FIG. 2 having a computer usable medium 48 with code elements A–D stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Now referring to FIG. 3, the database setup logic of the present invention can be seen. Commencing at block 50, the link manager 34 cooperates with the server control modules 16 to crawl the Web servers 12, 14 to identify the assets 22 and reference pointers 24, 26. Proceeding to block 52, metadata representing the assets 22 and reference pointers 24, 26 is sent to the database 32 for storage therein. Once the database 32 receives the metadata, the metadata is linked to the corresponding assets 22/reference pointers 24, 26 preferably in accordance with DataLinks principles summarized above to prevent deleting, renaming, or otherwise modifying the assets 22 in a way that would render a hyperlink "broken". By "broken" is meant that the hyperlink points to an asset that either does not exist or that exists in a location other than that pointed to, or that otherwise would result in a "file not found" message when the hyperlink is invoked.

At decision diamond 56 it is determined whether any hyperlink is broken by, e.g., invoking the reference pointers 24, 26 one by one and determining whether the pointed-to asset 22 is in fact arrived at. If no broken links are found, the setup process ends at state 58. Otherwise, the logic moves to block 60 to repair the broken reference pointer. This repair can be undertaken "manually" by a user by, e.g., copying a missing asset into the location indicated by the reference pointer. Or, the repair can be undertaken using an authoring tool to create a missing asset or to modify an existing asset appropriately, or by deleting the pointer altogether. The new and/or fixed assets are then crawled at block 62 using the above principles, and then the logic loops back to block 52 as shown.

When a new asset 22 is to be created, the logic of FIG. 4 is invoked to block 64. Moving to block 66, in the currently preferred embodiment the authoring tool attempting to create the asset is modified to publish to an intermediate directory. Next, at block 68, modifications can be made by the authoring tool in the intermediate directory, and these modifications are then copied to the intended Web server 12, 14. At block 70, the new assets are crawled using the logic of FIG. 3, and the database 32 is then updated accordingly.

Figure 5:
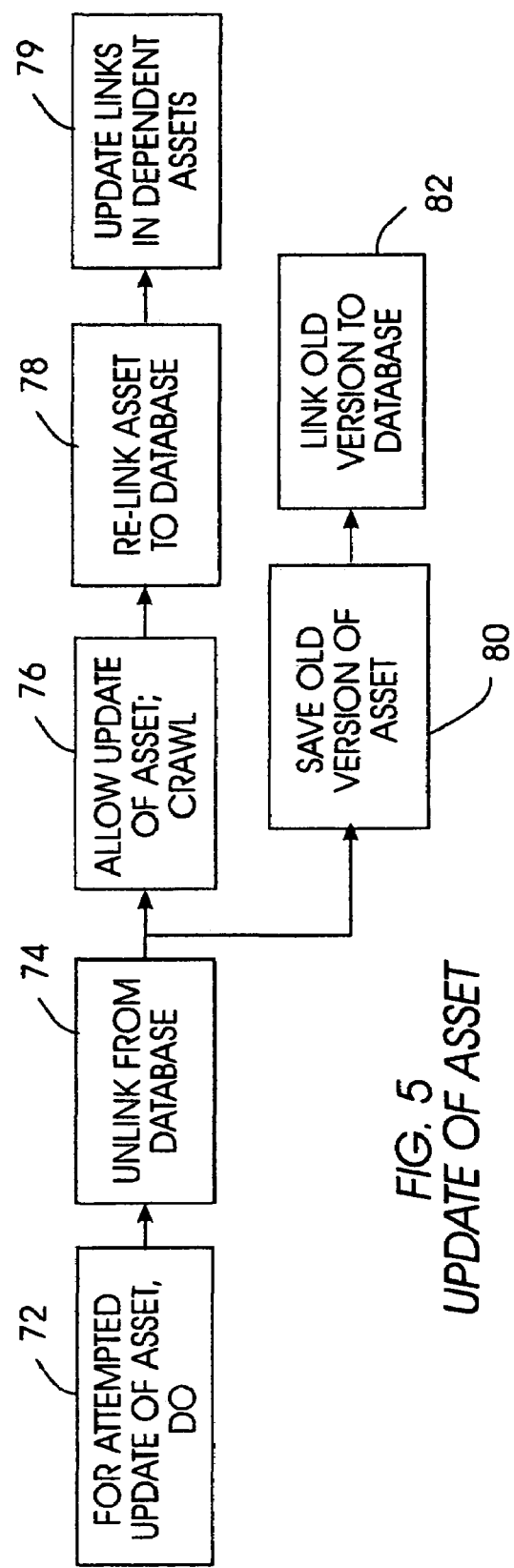
FIG. 5 is a flow chart showing the logic for modifying assets while ensuring link integrity.

When a user wishes to update (e.g., rename or modify content) an asset 22, that is already logically present in the database 32, the logic of FIG. 5 is invoked commencing at block 72. Proceeding to block 74, the asset is unlinked from the database 32, i.e., the robust pointers 31 to the asset sought to be modified are disabled. The update is then allowed to be undertaken at block 76, after which the asset is crawled and then relinked to the database 32 at block 78 by enabling the robust pointers 31. Also, links in dependent assets, i.e., assets that are pointed to from the asset that was updated at block 76, are updated at block 79, creating new versions of these assets as well. In addition, the unmodified version of the asset can be saved at block 80 and linked back to the database 32 at block 82, for archiving purposes.

FIG. 6 shows an XML-based hierarchical display of metadata in the database 32 that can be presented on a visual interface or the monitor 42 (FIG. 1) if desired. As shown, the metadata can include group assets with corresponding identifications, as well as file assets with corresponding numbers, identifications, and hyperlinks. The author and owner of the asset can also be included, as well as other metadata such as file size, comments, content characteristics, etc. The hierarchies can be preserved within these relational tables, with subsequent generation of XML implementing the hierarchical scheme. Data management using the present invention advantageously does not require that data (assets) be transferred; metadata transfer is sufficient.

While the particular SYSTEM AND METHOD FOR WEB ASSET MANAGEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

I claim:

1. A computer-implemented method for managing assets on plural Web servers, comprising the acts of:

crawling the Web servers to identify assets and hyperlinks therein;

storing data representative of the assets and hyperlinks in a database; and using the database, ensuring that when a user browser selects a hyperlink represented in the database, the user is not presented with a "file not found" message.

2. The method of claim 1, further comprising the acts of:
determining that any hyperlink is a broken hyperlink when the hyperlink points to an asset not represented in the database;
undertaking action to address broken hyperlinks, the integrity of the hyperlinks being preserved once the hyperlinks are addressed.

3. The method of claim 2, wherein the undertaking act includes modifying an asset on the Web server or adding an asset to the Web server such that when a user browser selects a hyperlink in an asset on one of the Web servers, the user is not presented with a "file not found" message.

4. The method of claim 1, wherein the using act further includes:
linking the data representative of the assets and hyperlinks resident in the database to the corresponding assets on the Web servers.

5. The method of claim 4, further comprising the acts of:
determining that a user is attempting to create a new asset on one of the Web servers;
receiving the new asset;
copying the new asset to a Web server;
crawling the new asset to identify assets and hyperlinks therein; and
storing data representative of the assets and hyperlinks in the database.

6. The method of claim 4, further comprising the acts of:
determining that a user is attempting to modify an existing asset in one of the Web servers;
unlinking the existing asset from the database;
allowing the user to update the existing asset to render a modified asset, a copy of the existing asset being retained;
crawling the modified asset to identify assets and hyperlinks therein;
storing data representative of the assets and hyperlinks of the modified asset in the database; and
relinking the modified asset and existing asset with the database.

7. The method of claim 1, wherein the database is remote from the Web servers.

8. The method of claim 1, further comprising automatically backing up the assets and hyperlinks when the database is backed up.

9. The method of claim 8, further comprising automatically recovering backed up assets and hyperlinks to their respective Web servers when the database is recovered.

10. A computer system for managing assets in a data repository such as at least one Web server or at least one file system, comprising:
computer readable code means for identifying the assets and for identifying reference pointers in the assets to other assets in the data repository;
computer readable code means for determining that a reference pointer is a broken reference pointer when the reference pointer refers to an asset not present in the data repository, such that a system manager can address the broken reference pointers, wherein the data repository includes at least one file system or at least two Web servers, and the system further comprises:
computer readable code means for linking the assets to a database containing metadata representative of the assets and reference pointers, such that backups of the database automatically cause the associated assets to be backed up on the file system or web servers;
wherein at least one of the code means is stored on a computer-readable medium.

11. The system of claim 10, wherein broken reference pointers are addressed using computer readable code means such that subsequent computer-based selections of the reference pointers are not possible or, if possible, do not result in "file not found" messages.

12. The system of claim 10, further comprising:
computer readable code means for determining that a user is attempting to create a new asset on one of the Web servers;
computer readable code means for receiving the new asset;
computer readable code means for copying the new asset to a Web server;
computer readable code means for crawling the new asset to identify assets and hyperlinks therein; and
computer readable code means for storing data representative of the assets and hyperlinks in the data base.

13. The system of claim 12, further comprising:
computer readable code means for determining that a user is attempting to modify an existing asset in one of the Web servers;
computer readable code means for unlinking the asset from the database;
computer readable code means for allowing the user to update the asset to render a modified asset;
computer readable code means for crawling the modified asset to identify assets and hyperlinks therein;
computer readable code means for storing data representative of the assets and hyperlinks of the modified asset in the database; and
computer readable code means for relinking the database with the modified asset.

14. A computer readable medium including at least one program of instructions readable by a Web server to undertake method acts comprising:
crawling the web server to identify assets and hyperlinks therein:
sending metadata representative of the assets and hyperlinks to a database, whereby when a user browser selects a hyperlink represented in the database, the user is never presented with a "file not found" message.

15. The computer readable medium of claim 14, wherein the method acts further comprise:
determining that a user is attempting to create a new asset the Web server;
receiving the new asset;
copying the new asset to a Web server;
crawling the new asset to identify assets and hyperlinks therein; and
storing metadata representative of the assets and hyperlinks in the database.

16. The computer readable medium of claim 15, wherein the method acts further comprise:
determining that a user is attempting to modify an existing asset in the Web server, such that the asset can be unlinked from the database in response;
allowing the user to update the asset to render a modified asset;
crawling the modified asset to identify assets and hyperlinks therein;
sending metadata representative of the assets and hyperlinks of the modified asset in the database, such that the database can be relinked with the modified asset.

17. A computer readable medium including a program of instructions to undertake method acts comprising:
receiving, in a database, data representative of assets and hyperlinks from plural web server;

maintaining the database such that when a user browser selects a hyperlink represented in the database, the user is never presented with a "file not found" message.

18. The computer readable medium of claim 17, wherein the method acts further comprise:
   determining whether any hyperlink is a broken hyperlink when the hyperlink points to an asset not represented in the database; and
   facilitating action to address broken hyperlinks.

19. The computer readable medium of claim 17, wherein the method acts further include:
   linking the data representative of the asset and hyperlinks resident in the database to the corresponding assets on the Web servers.

* * * * *